US 9,476,588 B2

(12) United States Patent
Okazaki et al.

(10) Patent No.: US 9,476,588 B2
(45) Date of Patent: Oct. 25, 2016

(54) BOILER AND OPERATING METHOD OF SAME

(75) Inventors: Hirofumi Okazaki, Mito (JP); Koji Kuramashi, Kure (JP); Hideo Okimoto, Kure (JP); Kenichi Ochi, Kure (JP); Naoya Imooka, Kure (JP); Pauli Dernjatin, Helsinki (FI)

(73) Assignee: MITSUBISHI HITACHI POWER SYSTEMS, LTD., Yokohama-Shi (JP)

( * ) Notice: Subject to any disclaimer, the term of this patent is extended or adjusted under 35 U.S.C. 154(b) by 700 days.

(21) Appl. No.: 13/877,522

(22) PCT Filed: Oct. 21, 2011

(86) PCT No.: PCT/JP2011/005901
§ 371 (c)(1),
(2), (4) Date: Jun. 4, 2013

(87) PCT Pub. No.: WO2012/053222
PCT Pub. Date: Apr. 26, 2012

(65) Prior Publication Data
US 2013/0273481 A1 Oct. 17, 2013

(30) Foreign Application Priority Data
Oct. 22, 2010 (JP) ................... 2010-237077

(51) Int. Cl.
*F23L 7/00* (2006.01)
*F23N 3/00* (2006.01)
*F23C 9/00* (2006.01)

(52) U.S. Cl.
CPC ............ *F23L 7/007* (2013.01); *F23C 9/00* (2013.01); *F23C 9/003* (2013.01); *F23N 3/002* (2013.01); *F23L 2900/07001* (2013.01); *F23L 2900/07005* (2013.01); *F23L 2900/07006* (2013.01); *F23N 2021/12* (2013.01); *F23N 2037/26* (2013.01); *Y02E 20/322* (2013.01); *Y02E 20/344* (2013.01)

(58) Field of Classification Search
CPC ............ F23L 2900/07005; F23L 2900/07006; F23L 7/007; F23L 2900/07001; F23N 3/002; F23N 2037/26; F23N 2021/12; F23C 9/003; F23C 9/00; Y02E 20/344; Y02E 20/322
USPC .......................................................... 431/12
See application file for complete search history.

(56) References Cited

U.S. PATENT DOCUMENTS

| 4,135,874 A | * | 1/1979 | Tsuzi | ...................... F23C 6/045 431/115 |
| 2008/0286707 A1 | * | 11/2008 | Panesar | ................... F23L 7/007 431/10 |
| 2009/0272300 A1 | * | 11/2009 | Yamada | ................ F22B 35/002 110/190 |

(Continued)

FOREIGN PATENT DOCUMENTS

| JP | 63058007 A | 3/1988 |
| JP | 20100321 A | 2/2010 |

(Continued)

OTHER PUBLICATIONS

International Search Report for PCT/JP2011/005901 dated Jan. 17, 2012.

*Primary Examiner* — Alfred Basichas
(74) *Attorney, Agent, or Firm* — Heslin Rothenberg Farley & Mesiti P.C.

(57) ABSTRACT

A boiler operating method operates a boiler by switching between air combustion mode and oxygen combustion mode when burning fossil fuel with first combustion gas and second combustion gas. The second combustion gas compensates for oxygen deficiency in the first combustion gas. The air combustion mode uses air as the first combustion gas and the second combustion gas while the oxygen combustion mode uses mixed gas of combustion flue gas and oxygen-rich gas as the first combustion gas and the second combustion gas, the combustion flue gas being produced when the fossil fuel is burned. By mixing the oxygen-rich gas in the air in the process of switching between air combustion mode and oxygen combustion mode, the air being the first combustion gas used in the air combustion mode, the boiler operating method can switch between the air combustion mode and oxygen combustion mode while maintaining stable combustion.

5 Claims, 10 Drawing Sheets

(56) References Cited

U.S. PATENT DOCUMENTS

2011/0132243 A1* 6/2011 Terushita ............ F22B 35/002
110/345

FOREIGN PATENT DOCUMENTS

| JP | 2011075176 A | 4/2011 |
|---|---|---|
| WO | 2009110036 A1 | 9/2009 |

* cited by examiner

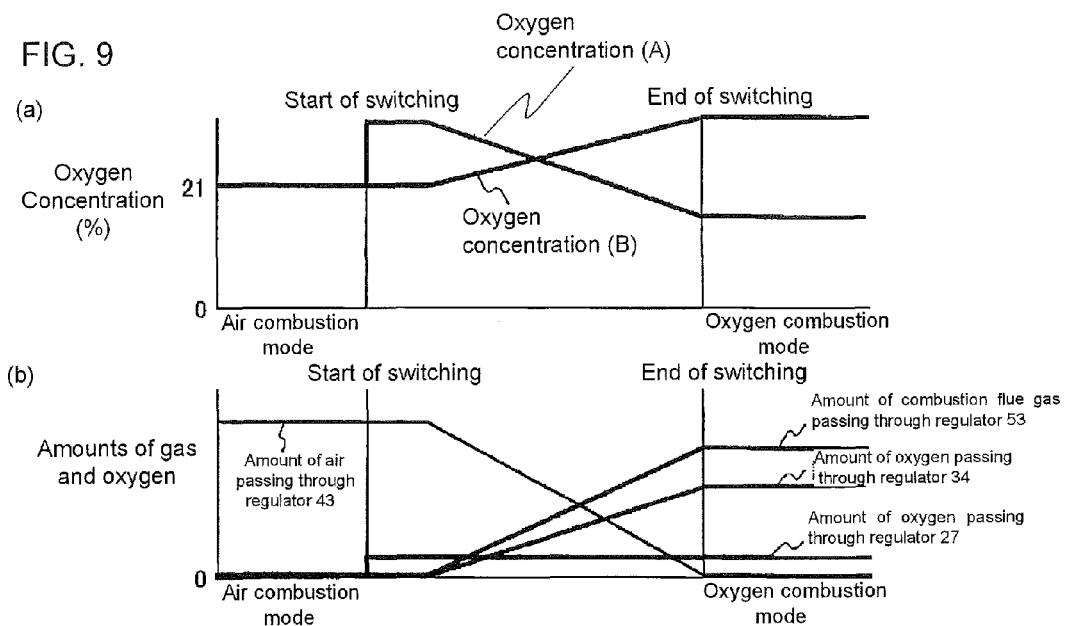
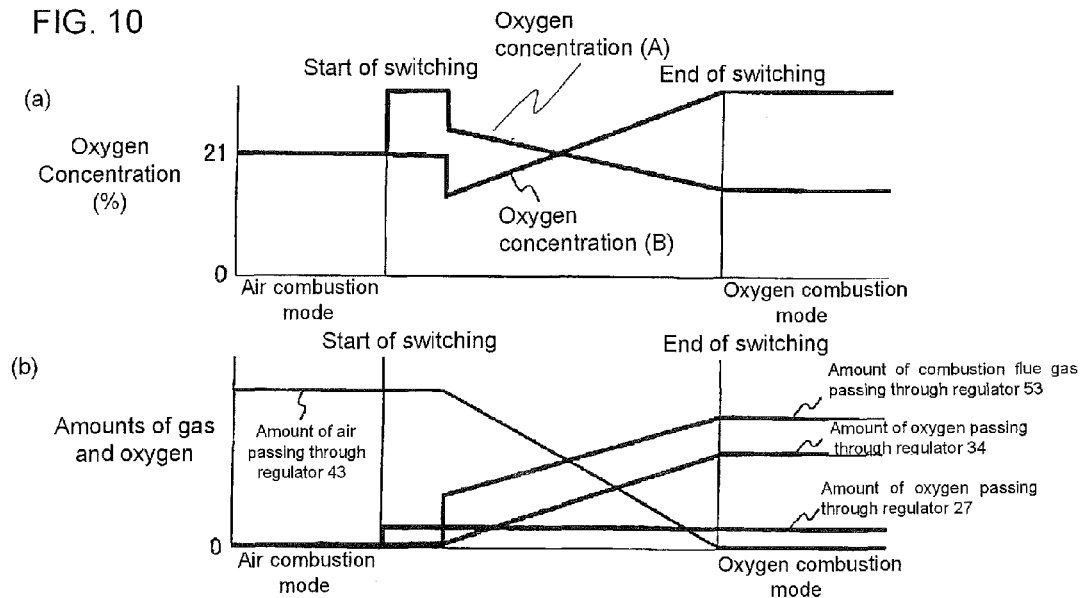

BOILER AND OPERATING METHOD OF SAME

CROSS REFERENCE TO RELATED APPLICATIONS

This application is the U.S. National Filing of PCT Application No. PCT/JP2011/005901 filed on Oct. 21, 2011 and published in Japanese as WO 2012/053222 A1 on Apr. 26, 2012, and claims priority of Japanese application JP 2010-237077 filed on Oct. 22, 2010, the entire disclosure of these applications being hereby incorporated herein by reference.

TECHNICAL FIELD

The present invention relates to a boiler and a boiler operating method, and more particularly, to a technique for switching from air combustion mode to oxygen combustion mode or vice versa, such as during start-up or the like.

BACKGROUND ART

To reduce global warming and other environmental burden, there is a social demand for reduction of carbon dioxide ($CO_2$) emissions. $CO_2$ is produced, for example, when fossil fuels, such as coal, petroleum, and natural gas, and the like are burned. Thus, boilers which burn fossil fuels are expected to reduce $CO_2$ emissions produced as a result of the combustion.

Thus, Patent Literature 1 proposes to burn fuel in a so-called oxygen combustion mode, increasing $CO_2$ concentration in combustion flue gas, and thereby separate and recover $CO_2$ from the combustion flue gas, where the oxygen combustion mode involves separating air into gas mainly composed of oxygen and gas mainly composed of nitrogen and burning fuel using combustion gas made of a mixture of separated gas rich in oxygen (hereinafter referred to as oxygen-rich gas) and combustion flue gas. Also, Patent Literature 1 proposes to burn the fuel with air during boiler start-up when combustion flue gas is in short supply and burn the fuel by switching from air to mixed gas of oxygen-rich gas and combustion flue gas upon completion of the start-up.

On the other hand, Patent Literature 2 proposes to increase oxygen concentration in the combustion gas in the oxygen combustion mode, in which the combustion gas contains a lot of $CO_2$ with high specific heat, increasing a heating-up period of the fuel ejected from a fuel nozzle and resulting in an unstable flame.

CITATION LIST

Patent Literature

Patent Literature 1: JP-A-2001-336736
Patent Literature 2: JP-A-6-313509

SUMMARY OF INVENTION

Technical Problem

However, when switching the combustion gas from air to mixed gas of combustion flue gas and oxygen-rich gas, Patent Literatures 1 and 2 do not give consideration to how to control the air, combustion flue gas, and oxygen-rich gas. Therefore, when the combustion gas is switched between air combustion mode, in which fuel is burned with air, and oxygen combustion mode, combustion might become unstable.

A problem to be solved by the present invention is to switch combustion gas between air and mixed gas of combustion flue gas and oxygen-rich gas while maintaining stable combustion.

Solution to Problem

To solve the above problem, the present invention provides a boiler operating method which operates a boiler by switching between air combustion mode and oxygen combustion mode when burning fossil fuel with first combustion gas and second combustion gas, the second combustion gas compensating for oxygen deficiency in the first combustion gas, where the air combustion mode uses air as the first combustion gas and the second combustion gas while the oxygen combustion mode uses mixed gas of combustion flue gas and oxygen-rich gas as the first combustion gas and the second combustion gas, the combustion flue gas being produced when the fossil fuel is burned, wherein in the process of switching between the air combustion mode and the oxygen combustion mode, the oxygen-rich gas is mixed in the air which is the first combustion gas used in the air combustion mode.

With this configuration, when the first combustion gas is switched from air to mixed gas of combustion flue gas and oxygen-rich gas, for example, during start-up or the like, the oxygen-rich gas is mixed in the air, and then the air is replaced with the combustion flue gas. Consequently, during the process of switching the combustion gas from air to mixed gas, oxygen concentration in the first combustion gas used for primary combustion is maintained at a high level. This makes it possible to maintain ignition performance of fuel at a high level and thereby maintain stable combustion. This also applies when the first combustion gas is switched from mixed gas to air.

In this case, in the process of switching between air combustion mode and oxygen combustion mode, the oxygen concentration can be set higher in the first combustion gas than in air.

Also, in the process of the switching between the air combustion mode and the oxygen combustion mode, flow rates of the air and the combustion flue gas may be changed gradually. This makes it possible to replace the air and combustion flue gas differing in oxygen concentration slowly with each other, keeping the oxygen concentrations in the first and second combustion gases from changing suddenly, and thereby burn a fossil fuel in a stable manner.

Incidentally, in the process of switching from the air combustion mode to the oxygen combustion mode, the oxygen-rich gas can be mixed in the air used as the first combustion gas, and then the oxygen-rich gas can be mixed in the air used as the second combustion gas. On the other hand, in the process of switching from the oxygen combustion mode to the air combustion mode, the mixed gas used as the second combustion gas can be switched to the air, and then supply of the oxygen-rich gas mixed in the air used as the first combustion gas can be stopped.

Also, in the oxygen combustion mode in which the fossil fuel is burned with the mixed gas, the oxygen concentrations in the first and second combustion gases can be set equal or the oxygen concentration in the first combustion gas can be set lower than the oxygen concentration in the second combustion gas. For example, when the first combustion gas is used as a carrier gas for a fossil fuel such as pulverized coal, spontaneous ignition might occur during transport depending on the type of the pulverized coal. In this case, to prevent the spontaneous ignition, the oxygen concentration in the first combustion gas is decreased. Then, part of the second combustion gas with the higher oxygen concentration is supplied to a primary combustion zone to compensate for oxygen deficiency in the first combustion gas. This improves the ignition performance of the fossil fuel and ensures stable combustion.

Also, the present invention provides a boiler which performs the operating method according to the present invention, the boiler comprising: a furnace supplied with fossil fuel, first combustion gas for burning the fossil fuel, and second combustion gas for compensating for oxygen deficiency in the first combustion gas; and a controller adapted to perform the operation of switching between air combustion mode and oxygen combustion mode, where the air combustion mode uses air as the first combustion gas and the second combustion gas while the oxygen combustion mode uses mixed gas of combustion flue gas and oxygen-rich gas as the first combustion gas and the second combustion gas, the combustion flue gas being produced when the fossil fuel is burned, wherein in the process of switching from the oxygen combustion mode to the air combustion mode, the controller controls flow rate of the air, flow rate of the combustion flue gas, and flow rate of the oxygen-rich gas such that the oxygen-rich gas will be mixed in the air which is the first combustion gas used in the air combustion mode.

Advantageous Effects of Invention

The present invention can switch combustion gas between air and mixed gas of combustion flue gas and oxygen-rich gas while maintaining stable combustion.

BRIEF DESCRIPTION OF THE DRAWINGS

FIGS. 9($a$) and 9($b$) are diagrams showing operational status of the third embodiment, where FIG. 9($a$) is a time chart showing time variations of oxygen concentrations and FIG. 9($b$) is a time chart showing time variations in amounts of air, flue gas, and oxygen-rich gas.

FIGS. 10($a$) and 10($b$) are diagrams showing other operational status of the third embodiment, where FIG. 10($a$) is a time chart showing time variations of oxygen concentrations and FIG. 10($b$) is a time chart showing time variations in amounts of air, flue gas, and oxygen-rich gas.

DESCRIPTION OF EMBODIMENTS

The present invention will be described below based on embodiments.

First Embodiment

Figure 1:
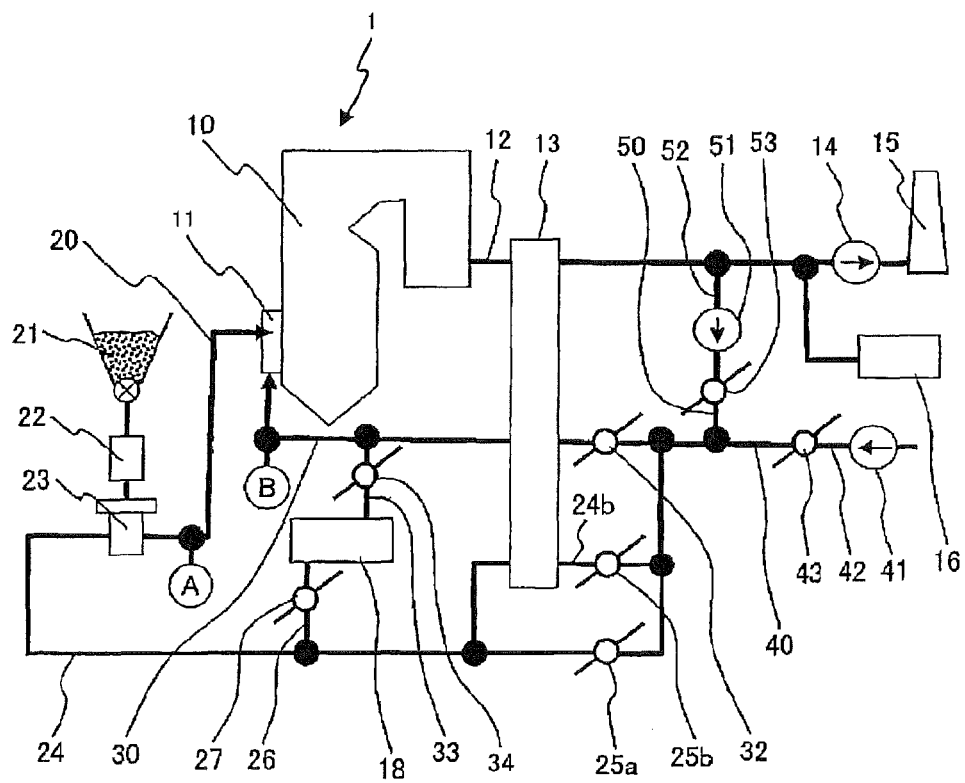
FIG. 1 is a block diagram of a boiler plant including a boiler according to a first embodiment.

As shown in FIG. 1, an oxygen combustion boiler 1 according to a first embodiment is installed in a boiler plant. The boiler 1 is designed to be able to operate by switching between an air combustion mode in which air is used as combustion gas and an oxygen combustion mode in which mixed gas of oxygen-rich gas and combustion flue gas is used as combustion gas. The boiler 1 is equipped with a furnace 10 supplied with fossil fuel such as pulverized coal, first combustion gas for burning the pulverized coal, and second combustion gas for compensating for oxygen deficiency in the first combustion gas. A burner 11 adapted to burn the pulverized coal is installed on a furnace wall of the furnace 10.

The burner 11 is connected with a fuel supply tube 20 adapted to supply pulverized coal to the burner 11 using the first combustion gas as a carrier gas. Also, the burner 11 is connected with a combustion gas supply tube 30 adapted to supply the second combustion gas to the burner 11 to compensate for oxygen deficiency in the first combustion gas. A pulverized-coal supply device is installed midway on a conduit of the fuel supply tube 20, where the pulverized-coal supply device includes a hopper 21 adapted to store coal, a coal supply machine 22 adapted to supply the coal stored in the hopper 21 to a crushing machine 23, and the crushing machine 23 adapted to crush the coal supplied from the coal supply machine 22 to a set size. A carrier gas supply tube 24 is connected to an upstream side of the fuel supply tube 20 to supply the first combustion gas as the carrier gas to the crushing machine 23.

A bypass tube 24$b$ is disposed midway along a flow channel of the supply tube 24, bypassing the supply tube 24. Flow regulators 25$a$ and 25$b$ capable of adjusting supplied amounts of carrier gas flowing through the supply tube 24 and bypass tube 24$b$ are installed on the respective tubes. The flow regulators 25$a$ and 25$b$ are designed to adjust flow rates of the carrier gas flowing through the respective tubes. Also, the flow regulators 25$a$ and 25$b$ are designed to output valve position signals to a controller 100 described later, where the valve position signals are used to compute the flow rates of the carrier gas.

On the other hand, a flow regulator 32 adapted to adjust a supplied amount of the second combustion gas is installed on the supply tube 30 which supplies the second combustion gas to the burner 11. The flow regulator 32 is designed to output a valve position signal to the controller 100 described later, where the valve position signal is used to compute the flow rate of the second combustion gas flowing through the tube.

The supply tubes 24 and 30 are connected with oxygen-rich gas supply tubes 26 and 33, respectively. The supply tubes 26 and 33 are provided with flow regulators 27 and 34 capable of adjusting supplied amounts of the oxygen-rich gas flowing through the respective supply tubes. The supply tube 26 is designed to mix oxygen-rich gas in the carrier gas on the upstream side of the crushing machine 23. The flow regulators 27 and 34 are designed to output valve position signals to the controller 100 described later, where the valve position signals are used to compute the flow rates of the oxygen-rich gas flowing through the tubes.

The supply tubes 26 and 33 are connected with an oxygen production device 18 adapted to generate oxygen-rich gas. The oxygen production device 18 may be, for example, a device designed to separate air into gas mainly composed of oxygen and gas mainly composed of nitrogen based on a cryogenic separation method. This will make it possible to supply oxygen needed to burn pulverized coal to the furnace 10 when the pulverized coal is burned in oxygen combustion mode.

The combustion flue gas resulting from combustion of pulverized coal in the furnace 10 is cooled by a heat exchanger 13 via a flue 12. The combustion flue gas discharged from the heat exchanger 13 is designed to be introduced into a chimney 15 and $CO_2$ recovery device 16. The $CO_2$ recovery device 16 may be, for example, a known device which separates the $CO_2$ from the flue gas by liquefying the $CO_2$ in the flue gas. Incidentally, a flue gas purifying device (not shown) is installed in the flue 12 to purify the flue gas introduced into the chimney 15 and $CO_2$ recovery device 16.

When the pulverized coal is burned in oxygen combustion mode, the combustion flue gas is branched off into a pipe 52 on the downstream side of the heat exchanger 13 by a flue gas fan 51. The pipe 52 is provided with a flow regulator 53 adapted to adjust an amount of flue gas to be branched. The flow regulator 53 is designed to output a valve position signal to the controller 100 described later, where the valve position signal is used to compute the flow rate of the flue gas flowing through the pipe. The flue gas flowing past the flow regulator 53 is designed to be supplied to the supply tubes 24 and 30 via a pipe 50. The flow rate of the flue gas supplied to the carrier gas supply tube 24 is designed to be adjusted by the flow regulators 25a and 25b. The flow rate of the flue gas supplied to the supply tube 30 for the second combustion gas is designed to be adjusted by the flow regulator 32. This allows pulverized coal to be burned with mixed gas of oxygen-rich gas and combustion flue gas in oxygen combustion mode.

On the other hand, when the flue gas is in short supply, such as during start-up, the air combustion mode is used to burn the pulverized coal with air. In the air combustion mode, air is designed to be supplied from an air fan 41 to a supply tube 40 via a pipe 42. An amount of air supply is designed to be adjustable using a flow regulator 43. The flow regulator 43 is designed to output a valve position signal to the controller 100 described later, where the valve position signal is used to compute the amount of air supply.

Figure 2:
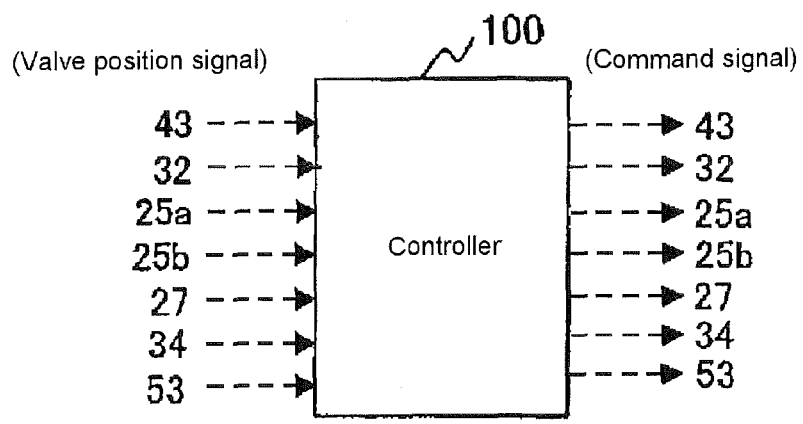
FIG. 2 is a conceptual diagram of a controller with which the boiler according to the first embodiment is equipped.

Next, a characteristic configuration of the first embodiment will be described. As shown in FIG. 2, the boiler 1 is provided with the controller 100 adapted to control the operation of supplying carrier gas and second combustion gas by switching between air and mixed gas of combustion flue gas and oxygen-rich gas, the combustion flue gas being produced when pulverized coal is burned. The controller 100 is designed to compute the flow rates of fluids flowing down through the flow regulators 43, 32, 25a, 25b, 27, 34, and 53 based on the valve position signals received from the respective flow regulators. Furthermore, the controller 100 is designed to output command signals to adjust the valve positions of the respective flow regulators 43, 32, 25a, 25b, 27, 34, and 53 based on the computed flow rates, causing the valve positions of the respective flow regulators 43, 32, 25a, 25b, 27, 34, and 53 to be adjusted, and thereby adjust the flow rates in corresponding parts. For example, the controller 100 is designed to output command signals instructing the flow regulators 43, 32, 25a, 25b, 27, 34, and 53 to adjust the respective valve positions based on comparison between the respective computed flow rates and corresponding set values determined in advance according to operating procedures for switching from air combustion mode to oxygen combustion mode. This allows the combustion of pulverized coal in the furnace 10 to be switched from air combustion mode to oxygen combustion mode.

Figure 3:
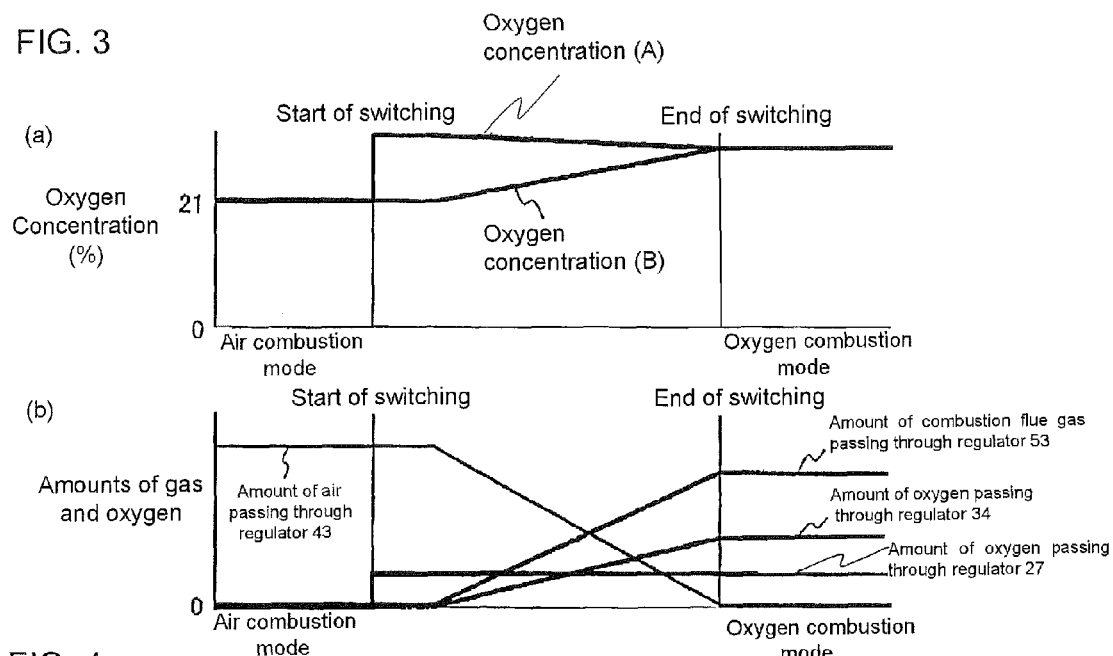
FIGS. 3($a$) and 3($b$) are diagrams showing operational status of the first embodiment, where FIG. 3($a$) is a time chart showing time variations of oxygen concentrations and FIG. 3($b$) is a time chart showing time variations in amounts of air, flue gas, and oxygen-rich gas.

Now, characteristic operation of the first embodiment will be described with reference to FIG. 3. Incidentally, FIGS. 3(a) and 3(b) are time charts showing the operation of switching from air combustion mode to oxygen combustion mode during start-up or the like of the boiler 1, where FIG. 3(a) is a time chart showing time variations of oxygen concentrations in carrier gas and second combustion gas while FIG. 3(b) is a time chart showing time variations of flow rates of air, flue gas, and oxygen. Incidentally, oxygen concentration (A) in FIG. 3(a) is the oxygen concentration of the carrier gas at point A in FIG. 1 while oxygen concentration (B) is the oxygen concentration of the second combustion gas at point B in FIG. 1.

If the combustion flue gas or oxygen-rich gas is in short supply, such as during start-up, the air combustion mode is activated by driving the air fan 41. In so doing, the flow regulators 53, 27, and 34 are closed and the flow regulators 43, 32, 25a, and 25b are adjusted to set openings. Consequently, pulverized coal and air are supplied to the furnace 10 and the air combustion mode is started. Then, once necessary amounts of combustion flue gas and the like become available in the air combustion mode, the flow regulator 27 is adjusted to a set opening to mix oxygen-rich gas in the air for use as carrier gas. Consequently, as shown in FIG. 3(a), the oxygen concentration of the carrier gas at point A in FIG. 1 is maintained, for example, at a level higher than the oxygen concentration in air. Subsequently, the flue gas is branched by driving the flue gas fan 51 and the flow regulator 53 is opened step by step to start circulating the flue gas. Furthermore, while the circulation of the combustion flue gas is being started, the flow regulator 34 is opened step by step to allow oxygen-rich gas to be supplied to the supply tube 30 in which the second combustion gas is running. Then, the flow regulator 43 is closed gradually according to the opening of the flow regulator 53, and the air fan 41 is stopped, stopping the air supply. Consequently, the first combustion gas and second combustion gas supplied to the furnace 10 are switched from air to mixed gas of flue gas and oxygen-rich gas, the first combustion gas being used as carrier gas, and the furnace 10 is switched from air combustion mode to oxygen combustion mode. Incidentally, although according to the time chart shown in FIG. 3(b) in the first embodiment, to supply oxygen-rich gas to the second combustion gas, the flow regulator 34 is opened step by step while the circulation of the flue gas is being started, the oxygen-rich gas may be supplied after the circulation of the flue gas has been started.

Consequently, the oxygen concentration in the carrier gas (first combustion gas) used for primary combustion can be maintained at a high level in the process of switching from air combustion mode to oxygen combustion mode during start-up or the like, making it possible to improve the ignition performance of the pulverized coal and maintain stable combustion. That is, when the flue gas is mixed in the air used as the carrier gas, the oxygen concentration falls, lowering the ignition performance, and thus if the flue gas is mixed after increasing the oxygen concentration by mixing oxygen-rich gas in the air, decreases in the ignition performance of the pulverized coal can be curbed, enabling stable combustion of the pulverized coal.

In particular, in the process of switching between air combustion mode and oxygen combustion mode, the concentrations of gaseous components such as oxygen, carbon dioxide, and steam in the combustion flue gas will fluctuate with the amount of bleeding from the flue gas and supplied amounts of air and oxygen, making the oxygen concentration in the combustion gas prone to fluctuations. When there are fluctuations in the oxygen concentration in the combustion gas, the fuel ejected from the burner 11 of the furnace 10 will cause unstable flame formation with leaping flames, misfires, or the like. Consequently, amounts of heat transfer occurring in the boiler 1 become nonuniform, which may make it difficult to generate a desired amount of steam. To deal with this, if the oxygen concentration in the carrier gas used for primary combustion is maintained at a high level in switching between air combustion mode and oxygen combustion mode, a stable flame can be produced. This eliminates the need, for example, to support combustion using oil or gas during switching from air combustion mode to oxygen combustion mode, making it possible to reduce equipment cost for combustion support.

Incidentally, in the oxygen combustion mode, since the combustion gas contains a lot of $CO_2$ with high specific heat, to achieve an amount of heat recovery equivalent to that of air combustion, the oxygen concentration in the combustion gas is set to be 22 to 36% in the first embodiment so that the combustion gas will be higher in oxygen concentration than air. This allows heat transfer characteristics of oxygen combustion to be brought close to those of air combustion.

Also, when coal with high ignition performance is used as fuel, preferably an upper limit of oxygen concentration is set to approximately 32% to prevent spontaneous ignition of pulverized coal during transport.

Also, whereas oxygen concentration is constant in the air combustion mode, in which air is used as combustion gas, in oxygen combustion, the oxygen concentration in the combustion gas fluctuates with fluctuations of the oxygen concentration in the combustion flue gas. For example, if the oxygen concentration in combustion flue gas decreases, the combustion flue gas with the decreased oxygen concentration is supplied as the combustion gas to the furnace 10. This further decreases the oxygen concentration in the furnace 10, and thus preferably the oxygen concentration in the combustion gas is maintained at a high level.

Also, although in the first embodiment, an example of switching from air combustion mode to oxygen combustion mode has been described, if the procedures described above, i.e., the procedures for flow regulation in FIG. 3(b) are reversed, the combustion mode can be switched from oxygen combustion to air combustion.

Figure 4:
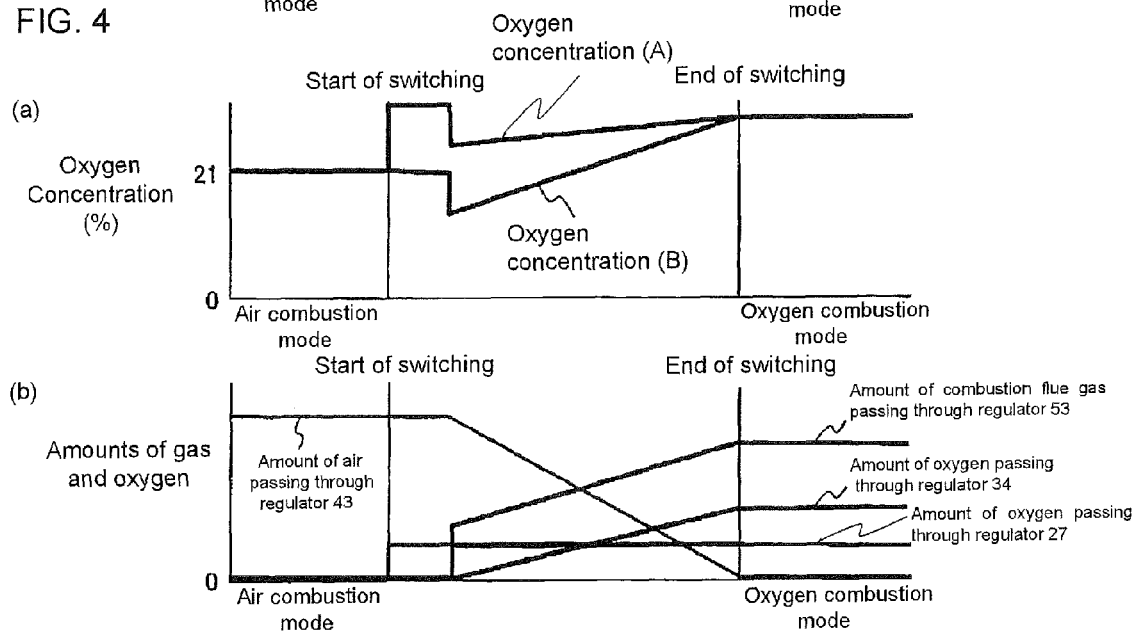
FIGS. 4($a$) and 4($b$) are diagrams showing other operational status of the first embodiment, where FIG. 4($a$) is a time chart showing time variations of oxygen concentrations and FIG. 4($b$) is a time chart showing time variations in amounts of air, flue gas, and oxygen-rich gas.

Also, as shown in FIG. 4, a rate of increase of flue gas is maximized at the start of flue gas supply and subsequently the flue gas can be controlled to increase gradually to eventually switch from air combustion mode to oxygen combustion mode.

Also, in the oxygen combustion mode, the combustion gas does not contain nitrogen, and the nitrogen contained in the flue gas generated when the fossil fuel is burned in the furnace 10 is limited to fuel-derived nitrogen. Therefore, the oxygen combustion mode can reduce the amount of flue gas more than the air combustion mode can. Also, since there are no nitrogen oxides produced from the nitrogen in air, production of nitrogen oxides is decreased.

Also, under operational conditions of a high load change rate as during start-up of the boiler 1, the boiler 1 is operated in the air combustion mode in which air is used as an oxidizer in burning the fuel, and after a certain load is reached, the boiler 1 is operated in the oxygen combustion mode by switching the oxidizer to mixed gas of combustion flue gas and oxygen-rich gas. During start-up such as described above, if an amount of combustion flue gas to be branched is increased and the oxygen concentrations in the first and second combustion gases are decreased, since carbon dioxide and steam contained in oxidative gas supplied to the furnace 10 have high specific heat, flame temperature falls, inhibiting combustion reactions of the pulverized coal. Thus, the operating method according to the first embodiment, if performed during start-up of the boiler 1, can keep the frame from leaping up, causing misfires, or otherwise becoming unstable.

Second Embodiment

Figure 5:
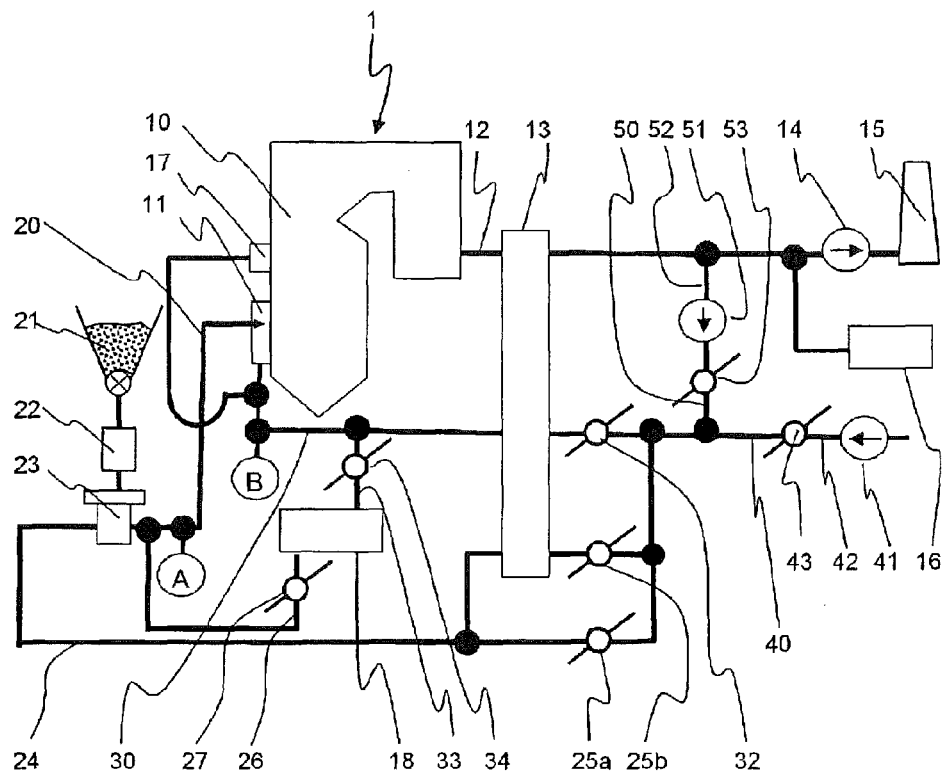
FIG. 5 is a block diagram of a boiler plant including a boiler according to a second embodiment.
Figure 6:
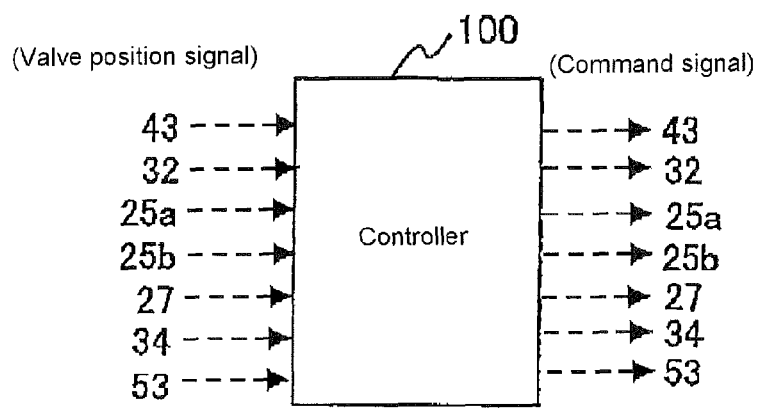
FIG. 6 is a conceptual diagram of a controller with which the boiler according to the second embodiment is equipped.

A block diagram of a boiler plant equipped with a boiler 1 according to a second embodiment is shown in FIG. 5. The second embodiment differs from the first embodiment in that the second combustion gas is bifurcated on an inlet side of the burner 11 with one of the branches being supplied to the burner 11 and the other branch of the combustion gas being supplied to a combustion gas supply port 17 via piping to carry out two-stage combustion of the pulverized coal and that the oxygen-rich gas supply tube 26 is connected to the fuel supply tube 20 connected to the downstream side of the crushing machine 23. Other components are the same as the first embodiment, and thus denoted by the same reference numerals as the corresponding components in the first embodiment and description thereof will be omitted.

Consequently, since the combustion gas for two-stage combustion is supplied through the supply port 17 installed above the burner 11 of the furnace 10, combustion is carried out by the burner 11 using a small amount of oxygen and the rest of oxygen is supplied through the supply port 17 installed in the furnace 10 downstream of the burner 11. This makes it possible to form reducing zone of an oxygen-deficiency in the furnace 10. Then, the gas in the furnace 10 passes through the reducing zone, making it possible to decrease nitrogen oxides produced when nitrogen components in the fuel are burned.

Also, since oxygen-rich gas is mixed in the carrier gas on the downstream side of the crushing machine 23, the oxygen concentration in the carrier gas introduced into the crushing machine 23 is maintained at a low level, making it possible to inhibit spontaneous ignition of pulverized coal in the crushing machine 23.

Third Embodiment

Figure 7:
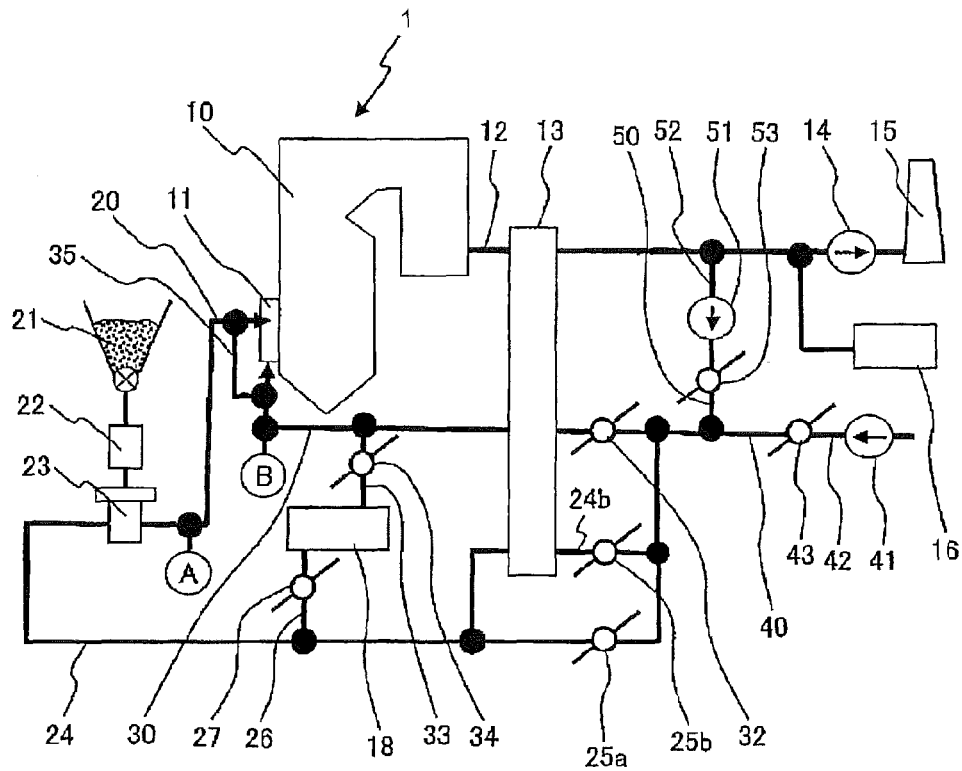
FIG. 7 is a block diagram of a boiler plant including a boiler according to a third embodiment.
Figure 8:
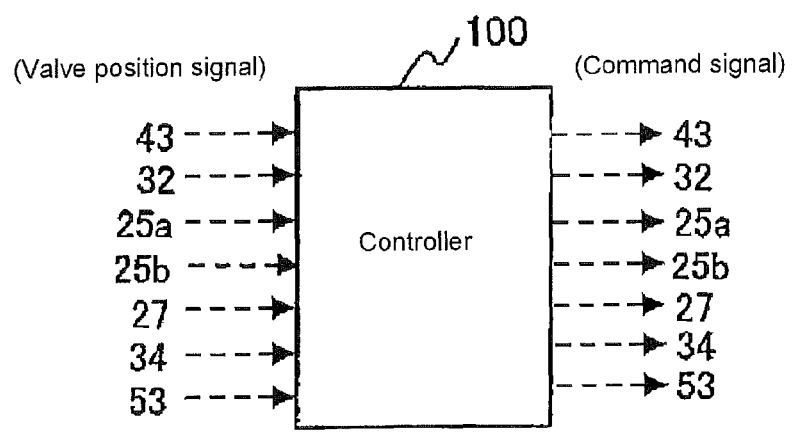
FIG. 8 is a conceptual diagram of a controller with which the boiler according to the third embodiment is equipped.

A boiler plant equipped with a boiler 1 according to a third embodiment is shown in FIGS. 7 and 8. The third embodiment differs from the first embodiment in that to supply the second combustion gas to the carrier gas carrying pulverized coal, a pipe 35 branching off from the supply tube 30 is connected, on the side of the burner 11, to the fuel supply tube 20 through which the pulverized coal is transported pneumatically and that in the oxygen combustion mode, the oxygen concentration in the carrier gas is controlled to be lower than the oxygen concentration in the second combustion gas. Other components are the same as the first embodiment, and thus denoted by the same reference numerals as the corresponding components in the first embodiment and description thereof will be omitted.

Next, the operation of switching from air combustion mode to oxygen combustion mode according to the third embodiment will be described with reference to FIG. 9. FIG. 9(a) is a time chart showing time variations of oxygen concentrations in carrier gas and second combustion gas while FIG. 9(b) is a time chart showing time variations of flow rates of air, flue gas, and oxygen. Incidentally, oxygen concentration (A) in FIG. 9(a) is the oxygen concentration of the carrier gas at point A in FIG. 7 while oxygen concentration (B) is the oxygen concentration of the second combustion gas at point B in FIG. 7.

If the flue gas or oxygen-rich gas is in short supply, such as during start-up, the air combustion mode is activated by driving the air fan 41. In so doing, the flow regulators 53, 27, and 34 are closed and the flow regulators 43, 32, 25a, and 25b are adjusted to set openings. Consequently, pulverized coal and air are supplied to the furnace 10 and the air combustion mode is started. Then, once necessary amounts of flue gas and the like become available in the air combustion mode, the flow regulator 27 is adjusted to a set opening and oxygen-rich gas is mixed in the air for use as carrier gas. Consequently, as shown in FIG. 9(a), the oxygen concentration of the carrier gas at point A in FIG. 7 is maintained, for example, at a level higher than the oxygen concentration in air. Subsequently, the flue gas is branched by driving the flue gas fan 51 and the flow regulator 53 is opened step by step to start circulating the flue gas. Furthermore, while the circulation of the flue gas is being started, the flow regulator 34 is opened step by step to allow oxygen-rich gas to be supplied to the supply tube 30 in which the second combustion gas is running. Then, the flow regulator 43 is closed gradually according to the opening of the flow regulator 53, and the air fan 41 is stopped, stopping the air supply. Consequently, the carrier gas and second combustion gas supplied to the furnace 10 are switched from air to mixed gas of flue gas and oxygen-rich gas, and the furnace 10 is switched from air combustion mode to oxygen combustion mode. In the process of switching, after the oxygen-rich gas starts to be supplied to the supply tube 30 and the oxygen concentration in the second combustion gas reaches a set concentration, the valve position of the flow regulator 27 is throttled step by step, reducing the oxygen concentration in the carrier gas step by step. The valve position of the flow regulator 27 is set such that the oxygen concentration in the carrier gas during oxygen combustion will be lower than, for example, the oxygen concentration in air.

This makes it possible to prevent spontaneous ignition of pulverized coal, which when used as fuel, might ignite spontaneously during transport. That is, in the process of switching from air combustion mode to oxygen combustion mode, the oxygen concentration in the carrier gas before admixture of flue gas is maintained at a high level to curb decreases in the ignition performance of the pulverized coal due to the admixture of the flue gas. Subsequently, the oxygen concentration in the carrier gas is lowered to such a level at which the pulverized coal will not ignite spontaneously while the oxygen deficiency in the carrier gas is made up for by the second combustion gas supplied from the pipe 35 just before the burner 11. This makes it possible to improve the ignition performance of pulverized coal and inhibit spontaneous ignition of the pulverized coal, and thereby allows the use of pulverized coal with high ignition performance as a fuel.

Incidentally, the oxygen concentration in the carrier gas can be set appropriately according to the type of pulverized coal and the like and can be set equal to or lower than the oxygen concentration in air, for example, equal to or lower than 18%.

Also, as shown in FIG. 10, the rate of increase of flue gas is maximized at the start of combustion flue gas supply. Subsequently, the combustion flue gas can be supplied by being increased gradually to supply the combustion flue gas with stepwise increases. In this case, although the oxygen concentrations in the carrier gas and second combustion gas decrease at the start of combustion flue gas supply, since primary combustion has been carried out using the carrier gas made by mixing oxygen-rich gas in air, the oxygen concentration in the carrier gas is maintained at a high level, allowing flame stability to be maintained. Consequently, since fluctuations in a combustion zone of pulverized coal can be curbed, good heat transfer characteristics are available in the furnace 10, allowing heat to be absorbed with high efficiency.

Also, oxygen concentration increases only in the fuel supply tube 20, and thus fluctuations in the oxygen concentrations of the first combustion gas (carrier gas) and second combustion gas inputted in the furnace 10 are smaller than when the oxygen concentration of all the combustion gas is increased.

Also, although in the third embodiment, the carrier gas is supplemented with oxygen by supplying the second combustion gas to the fuel supply tube 20, oxygen deficiency in the carrier gas may be made up for by directly supplying oxygen-rich gas to the fuel supply tube 20.

Figure 11:
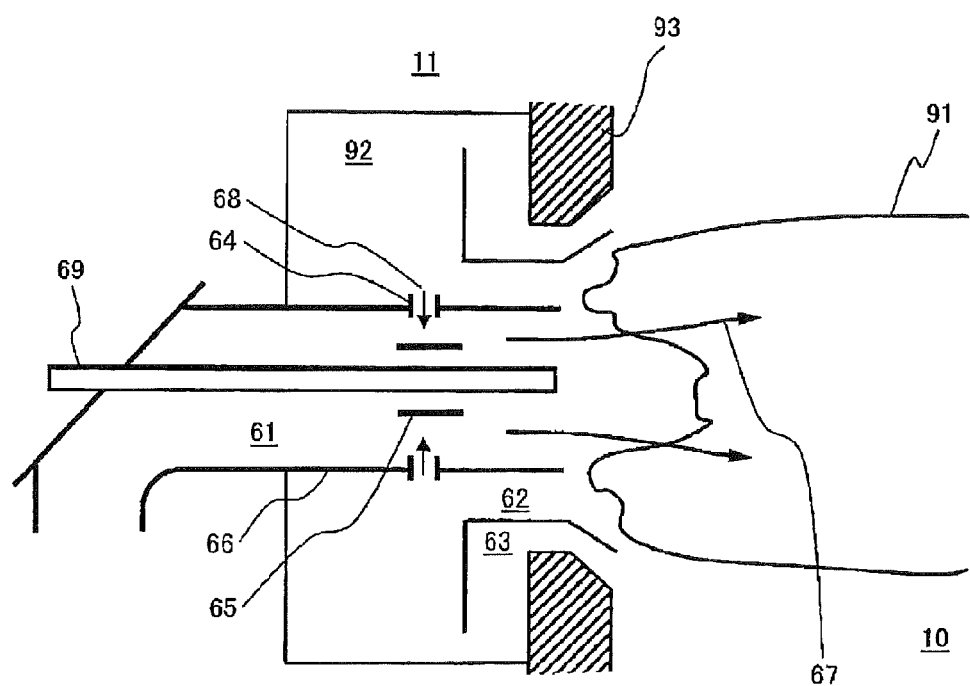
FIG. 11 is a sectional view of a burner suitable for the boiler according to the third embodiment.

Now, a burner suitable for the boiler 1 according to the third embodiment will be described with reference to FIG. 11. The burner 11 shown in FIG. 11 is structured to include a fuel nozzle 61 located on the center side and adapted to burn pulverized coal supplied in accompaniment with carrier gas, air nozzles 62 and 63 located concentrically on a periphery of the fuel nozzle 61 and adapted to supply combustion gas, and a wind box 92 installed on a furnace wall 93. Also, a combustion gas nozzle 64 is installed on a tube wall of the fuel nozzle 61 such that additional combustion gas 68 with a high oxygen concentration will be supplied into the fuel nozzle 61 from a supply source (not shown).

With this configuration, the additional combustion gas 68 is ejected perpendicularly to a flow 67 of pulverized coal and carrier gas flowing through the fuel nozzle 61. This facilitates mixing of the additional combustion gas 68 having a high oxygen concentration with the carrier gas. Moreover, if a distributor 65 adapted to divide a flow channel is installed in the fuel nozzle 61, the gas containing high-concentration oxygen will be supplied only to the vicinity of a peripheral partition wall 66 of the fuel nozzle 61. That portion of the fuel which flows through outer peripheral part of the fuel nozzle 61 is the first to start igniting after fuel ejection into the furnace 10 from the burner 11, and forms a flame contour 91 as a result of fuel combustion in the furnace 10. Therefore, increasing the oxygen concentration only in the vicinity of the peripheral partition wall 66 of the fuel nozzle 61 improves flame stability.

In particular, with the burner 11 shown in FIG. 11, since the oxygen concentration is increased only in part of the fuel nozzle 61, a smaller amount of gas supply is required than when the oxygen concentration is increased in the entire fuel nozzle 61. Furthermore, the gas containing high-concentration oxygen has only a short residence time after being mixed with fuel, and thus abnormal combustion is less liable to occur in the fuel nozzle 61.

Incidentally, instead of the additional combustion gas 68 made by mixing flue gas and oxygen-rich gas, oxygen-rich gas may be supplied into the fuel nozzle 61.

Also, although in relation to the fossil-fuel boiler 1 according to the present embodiment shown in FIG. 7, a case has been described in which all the combustion gas is supplied through the burner 11, part of the combustion gas may be supplied through the supply port 17 downstream of the burner 11 by branching the combustion gas. An oxygen-deficient reducing zone is formed in the furnace 10 as the fuel is burned in the burner 11 with a small amount of oxygen and the rest of oxygen is supplied through the supply port 17 of the furnace 10 downstream of the burner 11 to compensate for the oxygen deficiency. Then, the gas in the furnace passes through the reducing zone, making it possible to decrease nitrogen oxides produced when nitrogen components in the fuel are burned.

Fourth Embodiment

Figure 12:
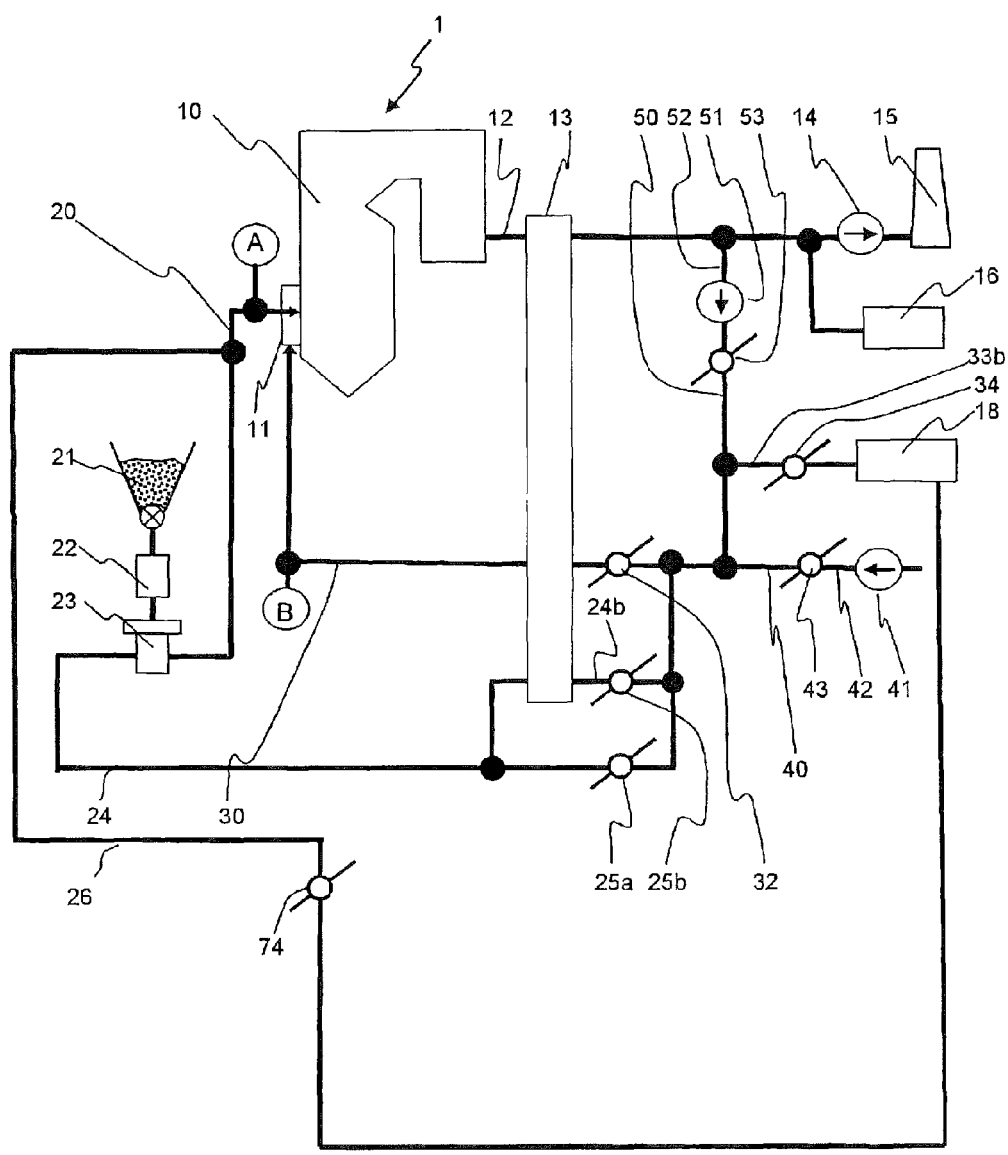
FIG. 12 is a block diagram of a boiler plant including a boiler according to a fourth embodiment.
Figure 13:
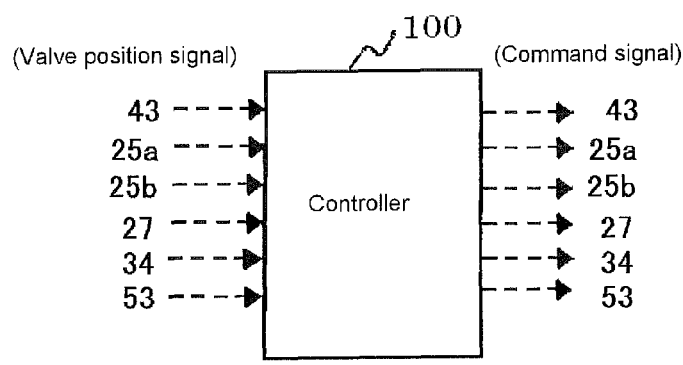
FIG. 13 is a conceptual diagram of a controller with which the boiler according to the fourth embodiment is equipped.

A block diagram of a boiler plant equipped with a boiler 1 according to a fourth embodiment is shown in FIGS. 12 and 13. The fourth embodiment differs from the first embodiment in that branched combustion flue gas running through the pipe 50 is mixed with oxygen-rich gas via a pipe 33b equipped with a flow regulator 34 and that oxygen-rich gas is supplied to the fuel supply tube 20 on the downstream side of the crushing machine 23. Other components are the same as the first embodiment, and thus denoted by the same reference numerals as the corresponding components in the first embodiment and description thereof will be omitted.

Figure 14:
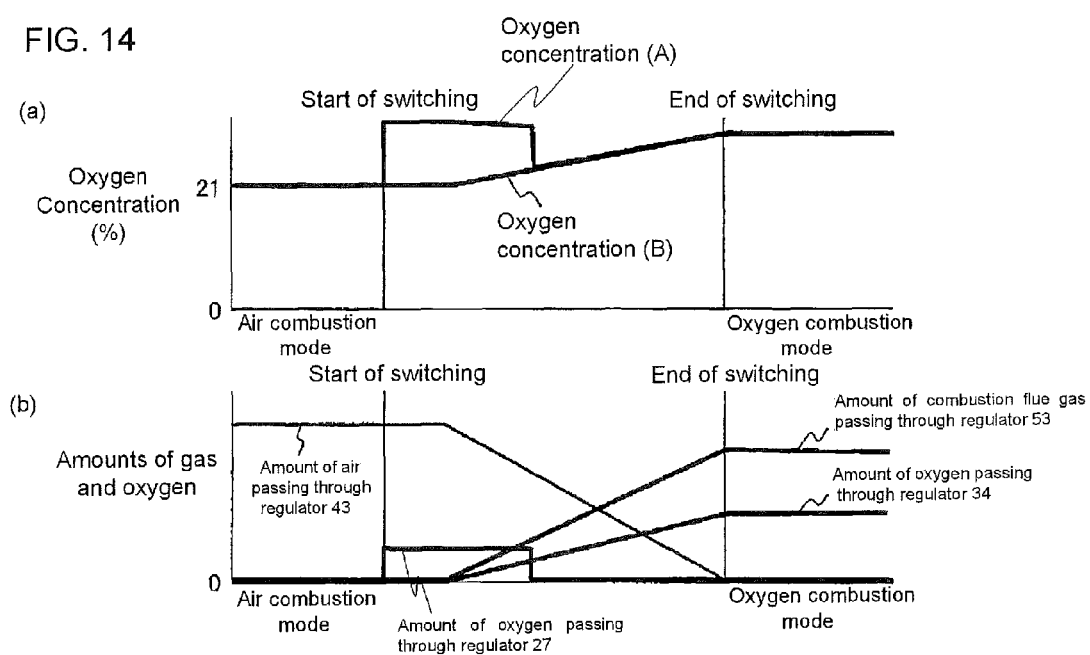
FIGS. 14($a$) and 14($b$) are diagrams showing operational status of the fourth embodiment, where FIG. 14($a$) is a time chart showing time variations of oxygen concentrations and FIG. 14($b$) is a time chart showing time variations in amounts of air, flue gas, and oxygen-rich gas.

Next, operation of the fourth embodiment will be described with reference to FIG. 14. FIG. 14(a) is a time chart showing time variations of oxygen concentrations in carrier gas and second combustion gas while FIG. 14(b) is a time chart showing time variations of flow rates of air, combustion flue gas, and oxygen. Incidentally, oxygen concentration (A) in FIG. 14(a) is the oxygen concentration of the carrier gas at point A in FIG. 12 while oxygen concentration (B) is the oxygen concentration of the second combustion gas at point B in FIG. 12.

If the combustion flue gas or oxygen-rich gas is in short supply, such as during start-up, the air combustion mode is activated by driving the air fan 41. In so doing, the flow regulators 53, 27, and 34 are closed and the flow regulators 43, 32, 25a, and 25b are adjusted to set openings. Consequently, pulverized coal and air are supplied to the furnace 10 and the air combustion mode is started. Then, once necessary amounts of flue gas and the like become available in the air combustion mode, the flow regulator 27 is adjusted to a set opening and oxygen-rich gas is mixed in the air for use as carrier gas. Consequently, as shown in FIG. 14(a), the oxygen concentration of the carrier gas at point A in FIG. 12 is maintained, for example, at a level higher than the oxygen concentration in air. Subsequently, the combustion flue gas is branched by driving the flue gas fan 51 and the flow regulator 53 is opened step by step to start circulating the flue gas. Furthermore, while the circulation of the combustion flue gas is being started, the flow regulator 34 is opened step by step to allow oxygen-rich gas to be supplied to the flue gas running through the pipe 50. Then, the flow regulator 43 is closed gradually according to the opening of the flow regulator 53, and the air fan 41 is stopped, stopping the air supply. Consequently, the carrier gas and second combustion gas supplied to the furnace 10 are switched from air to mixed gas of flue gas and oxygen-rich gas, and the furnace 10 is switched from air combustion mode to oxygen combustion mode. In the process of switching, after a lapse of a set period from when the flow regulator 34 is opened, the flow regulator 27 is closed, stopping the supply of oxygen-rich gas to the carrier gas through the supply tube 26. That is, by mixing oxygen-rich gas in the flue gas before branching into the carrier gas and second combustion gas, the fourth embodiment enables adjusting the oxygen concentrations in the carrier gas and second combustion gas using the flow regulator 34 alone in the oxygen combustion mode.

Consequently, although in the first half of the process of switching from air combustion mode to oxygen combustion mode, both flow regulator 27 and flow regulator 34 need to be controlled in order to adjust the supplied amounts of the oxygen-rich gas, in the latter half and oxygen combustion mode, it is sufficient to control the flow regulator 34 alone and the oxygen concentration is equalized between the carrier gas and second combustion gas, making control easier.

Figure 15:
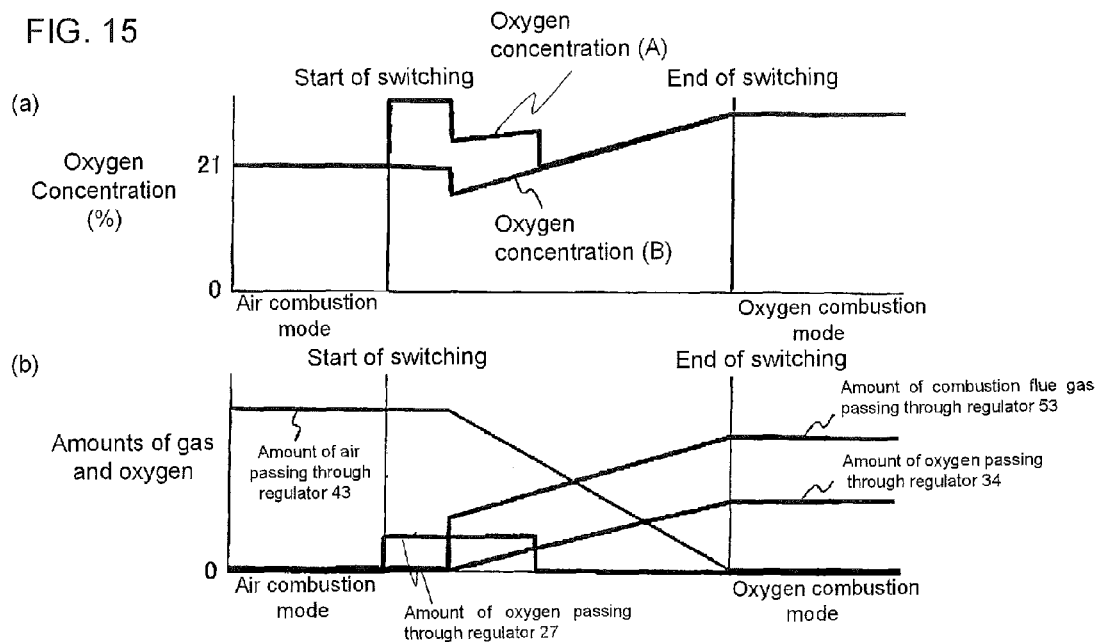
FIGS. 15($a$) and 15($b$) are diagrams showing other operational status of the fourth embodiment, where FIG. 15($a$) is a time chart showing time variations of oxygen concentrations and FIG. 15($b$) is a time chart showing time variations of amounts of air, flue gas, and oxygen-rich gas.

Incidentally, as shown in FIG. 15, the rate of increase of flue gas is maximized at the start of flue gas supply and subsequently the flue gas can be supplied by being increased gradually to supply the flue gas with stepwise increases.

Fifth Embodiment

Figure 16:
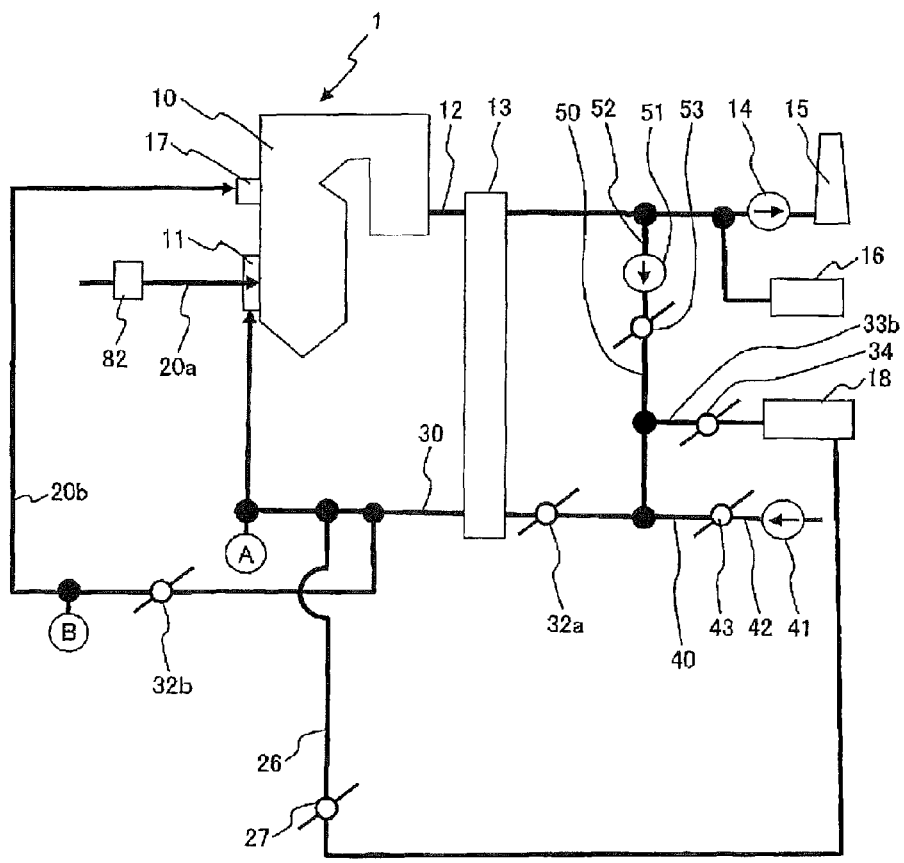
FIG. 16 is a block diagram of a boiler plant including a boiler according to a fifth embodiment.
Figure 17:
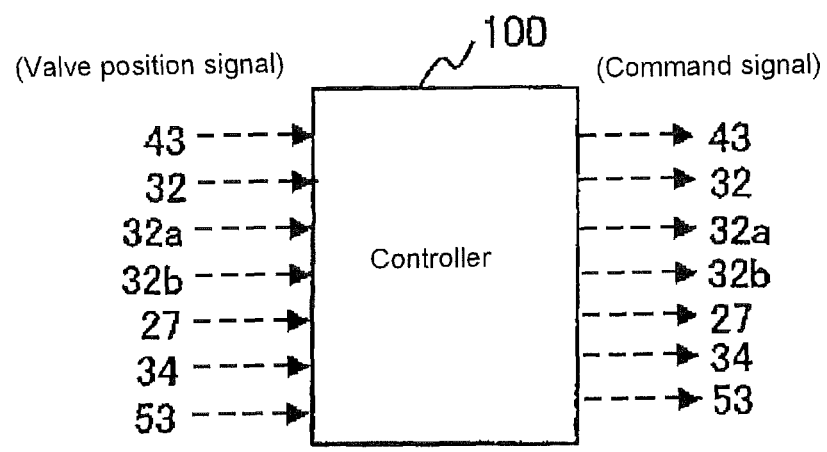
FIG. 17 is a conceptual diagram of a controller with which the boiler according to the fifth embodiment is equipped.

A block diagram of a boiler plant equipped with a boiler 1 according to a fifth embodiment is shown in FIGS. 16 and 17. The fifth embodiment differs from the first embodiment in that gas or oil is used as fuel instead of pulverized coal. That is, since gas and oil are supplied without using carrier gas (first combustion gas), the first combustion gas is supplied to the burner 11 separately from the fossil fuel rather than being used as carrier gas. Other components are the same as the first embodiment, and thus denoted by the same reference numerals as the corresponding components in the first embodiment and description thereof will be omitted.

The burner 11 is connected with a fuel supply pipe 20a. The fuel supply pipe 20a is designed to be supplied with a gaseous or liquid fossil fuel such as natural gas or heavy oil from a supply facility (not shown).

On the other hand, the first combustion gas is designed to be supplied to the burner 11 through the supply tube 30 to burn the fuel. Also, a supply port 17 to be supplied with the second combustion gas is installed on the downstream side of the burner 11 to compensate for oxygen deficiency with the second combustion gas.

Thus, in switching from air combustion mode to oxygen combustion mode, if flue gas is mixed after increasing the oxygen concentration by mixing the oxygen-rich gas in the air used as the first combustion gas, decreases in the ignition performance of pulverized coal can be curbed, enabling stable combustion of the pulverized coal.

The invention claimed is:

1. A boiler operating method comprising:
   burning a fossil fuel with a first combustion gas used to transport the fossil fuel and a second combustion gas used to compensate for oxygen deficiency of the first combustion gas;
   switching operations between air combustion mode in which air is used as the first and the second combustion gas, and oxygen combustion mode in which mixed gas of combustion flue gas of the fossil fuel and oxygen-rich gas is used as the first and the second combustion gas;
   in the process of switching from the air combustion mode to the oxygen combustion mode, mixing the oxygen-rich gas in the air used as the first combustion gas in the air combustion mode; and
   switching the air to the mixed gas of the combustion flue gas and the oxygen-rich gas, wherein in the process of switching from the air combustion mode to the oxygen combustion mode, the oxygen-rich gas is mixed in the air used as the first combustion gas, and then the oxygen-rich gas is mixed in the second combustion gas.

2. The boiler operating method according to claim 1, further comprising:
   using the first combustion gas as carrier gas for transporting the fossil fuel, and
   supplying part or all of the second combustion gas to a burner, wherein
   the process of switching from the air combustion mode to the oxygen combustion mode undergoes (1) to (4) below in sequence:
   (1) mixing the oxygen-rich gas in the carrier gas in the air combustion mode, and setting oxygen concentration in the carrier gas higher than oxygen concentration in the air;
   (2) introducing the combustion flue gas of the fossil fuel into the first and second combustion gases;
   (3) mixing the oxygen-rich gas in the second combustion gas; and
   (4) stopping supplying the air to the first and second combustion gases.

3. The boiler operating method according to claim 1, wherein when the fossil fuel is burned with the mixed gas, the oxygen concentration in the first combustion gas is set lower than the oxygen concentration in the second combustion gas.

4. A boiler operating method comprising:
   burning a fossil fuel with a first combustion gas used to transport the fossil fuel and a second combustion gas used to compensate for oxygen deficiency of the first combustion gas;
   switching operations between air combustion mode in which air is used as the first and the second combustion gas, and oxygen combustion mode in which mixed gas of combustion flue gas of the fossil fuel and oxygen-rich gas is used as the first and the second combustion gas;
   in the process of switching from the air combustion mode to the oxygen combustion mode, mixing the oxygen-rich gas in the air used as the first combustion gas in the air combustion mode; and
   switching the air to the mixed gas of the combustion flue gas and the oxygen-rich gas, wherein in the process of switching from the oxygen combustion mode to the air combustion mode, the mixed gas used as the second combustion gas is switched to the air, and then supply of the oxygen-rich gas mixed in the air used as the first combustion gas is stopped.

5. The boiler operating method according to claim 4, further comprising:
   using the first combustion gas as carrier gas for transporting the fossil fuel, and
   supplying part or all of the second combustion gas to a burner, wherein
   the process of switching from the oxygen combustion mode to the air combustion mode undergoes (1) to (4) below in sequence:
   (1) supplying the air to the first and second combustion gases;
   (2) stopping mixing the oxygen-rich gas in the second combustion gas;
   (3) stopping introducing the combustion flue gas of the fossil fuel into the first and second combustion gases, and setting oxygen concentration in the carrier gas higher than oxygen concentration in the air and oxygen concentration in the second combustion gas; and
   (4) stopping mixing the oxygen-rich gas in the carrier gas.

* * * * *